US007607784B2

(12) United States Patent
Shimaoka et al.

(10) Patent No.: US 7,607,784 B2
(45) Date of Patent: Oct. 27, 2009

(54) LIGHT EMISSION METHOD, LIGHT EMITTING APPARATUS AND PROJECTION DISPLAY APPARATUS

(75) Inventors: Yusaku Shimaoka, Osaka (JP); Hiroshi Miyai, Hyogo (JP); Takaaki Gyoten, Hyogo (JP)

(73) Assignee: Panasonic Corporation, Osaka (JP)

( * ) Notice: Subject to any disclaimer, the term of this patent is extended or adjusted under 35 U.S.C. 154(b) by 425 days.

(21) Appl. No.: 10/587,751

(22) PCT Filed: Jan. 27, 2005

(86) PCT No.: PCT/JP2005/001138

§ 371 (c)(1),
(2), (4) Date: Jul. 28, 2006

(87) PCT Pub. No.: WO2005/073952

PCT Pub. Date: Aug. 11, 2005

(65) Prior Publication Data

US 2007/0127237 A1 Jun. 7, 2007

(30) Foreign Application Priority Data

Jan. 28, 2004 (JP) ............................. 2004-019586

(51) Int. Cl.
*G03B 21/00* (2006.01)
*G03B 21/20* (2006.01)
*H04N 9/12* (2006.01)

(52) U.S. Cl. ............................ 353/85; 353/31; 348/742

(58) Field of Classification Search ................... 353/85, 353/84, 31; 348/742, 743, 801, 802; 345/82, 345/83, 87

See application file for complete search history.

(56) References Cited

U.S. PATENT DOCUMENTS 6,115,016 A 9/2000 Yoshihara et al.

(Continued)

FOREIGN PATENT DOCUMENTS

CN 2501070 Y 7/2002

(Continued)

OTHER PUBLICATIONS

Harbers, Gerard et al, "Performance of High Power LED Illuminators in Color Sequential Projection Displays," IDW '03, pp. 1585-1588.

(Continued)

*Primary Examiner*—William C Dowling
*Assistant Examiner*—Ryan Howard
(74) *Attorney, Agent, or Firm*—RatnerPrestia

(57) ABSTRACT

In a light source emitting single-color light represented by a solid light source such as a light emitting diode, a light output is increased while a color reproducibility is maintained. A red, a green, and a blue light emitting diode are controlled so that a first light emitting step of making the red light emitting diode emit light in a first light emission period, a second light emitting step of making the green light emitting diode emit light in a second light emission period, a third light emitting step of making the blue light emitting diode emit light in a third light emission period, and a fourth light emitting step of making the red light emitting diode, the green light emitting diode and the blue light emitting diode emit light at the same time in a fourth light emission period are carried out for display of one image.

2 Claims, 12 Drawing Sheets

U.S. PATENT DOCUMENTS

| | | | | |
|---|---|---|---|---|
| 6,961,038 | B2 * | 11/2005 | Yoshinaga et al. | 345/88 |
| 7,052,138 | B2 * | 5/2006 | Matsui | 353/31 |
| 7,303,284 | B2 * | 12/2007 | Imade | 353/31 |
| 7,391,475 | B2 * | 6/2008 | Pate et al. | 348/602 |
| 2002/0008712 | A1 * | 1/2002 | Shigeta | 345/690 |
| 2003/0218794 | A1 * | 11/2003 | Takeda et al. | 359/292 |
| 2004/0070736 | A1 * | 4/2004 | Roddy et al. | 353/31 |
| 2005/0052376 | A1 * | 3/2005 | Shivji | 345/82 |

FOREIGN PATENT DOCUMENTS

| | | | |
|---|---|---|---|
| JP | 07-056143 | A | 3/1995 |
| JP | 11-052327 | | 2/1999 |
| JP | 3215913 | | 2/1999 |
| JP | 2002-229531 | A | 8/2002 |
| JP | 2003-022061 | A | 1/2003 |
| JP | 2003-044016 | A | 2/2003 |
| JP | 2003-241714 | A | 8/2003 |
| JP | 2003-284088 | A | 10/2003 |

OTHER PUBLICATIONS

International Search Report for application No. PCT/JP2005/001138 dated Apr. 19, 2005.

* cited by examiner

LIGHT EMISSION METHOD, LIGHT EMITTING APPARATUS AND PROJECTION DISPLAY APPARATUS

This application is a U.S. national phase application of PCT International Application PCT/JP2005/001138, filed Jan. 27, 2005.

TECHNICAL FIELD

The present invention relates to a light emission method of a light source, a light emitting apparatus and the like, which are used in a projection display apparatus of projecting a large size image onto a screen using a light generating instrument as a light source, a light modulation element, a projection lens as a projection instrument, and the like.

BACKGROUND ART

In recent years, projection display apparatuses (projectors) using various kinds of light modulation elements have received attention as projection imaging devices capable of providing large size display. These projection display apparatuses illuminate a light modulation element capable of being optically modulated by a transmission or reflection liquid crystal, a DMD (digital micro-mirror device) capable of changing a reflection direction by very small mirrors arranged in the form of an array, or the like with light emitted from a light source as a light generating instrument, form an optical image corresponding to an image signal from the outside on the light modulation element, and project, at an enlarged scale, an optical image being illuminating light modulated by the light modulation element onto a screen by a projection lens.

As important optical characteristics of the projected large size image, there are a brightness of light emitted from the projection lens, a uniformity of brightness, a color reproducibility, i.e. a capability of more faithfully reproducing single colors such as red, green and blue, and colors such as white obtained by chromatic synthesis of the three colors, and the like.

In addition, recently, as a projection display apparatus, comprehensive capabilities required as a general image display apparatus, such as an instantaneous lighting capability of reducing time taken until the brightness of an image displayed on a screen reaches a maximum brightness after the power is tuned on, an easiness of installation, and a portability for conveyance or the like, have received attention as important items.

A conventional projection display apparatus using a light source unit 403 using a white lamp 401 such as an ultra-high pressure mercury lamp, an illumination unit 35 formed using an optical instrument allowing uniform illumination, a reflection display element 41 as a light modulation element and a projection lens 51 is shown in FIG. 8.

As an optical instrument allowing uniform illumination, a hallow cylindrical rod integrator 32 formed from a glass column or laminated mirrors is used. In this rod integrator 32, light incident from an opening on the incidence side is totally reflected and reflected at the mirror surface repeatedly to propagate through the rod, and a uniform light flux is emitted from an opening on the exit side. Furthermore, by using an illumination unit 35 using an optical instrument such as a lens 33, a mirror and a prism 36 in combination, a highly uniform light flux can be illuminated onto the reflection display element 41.

It is known that uniform illumination onto the display element can also be performed by using a lens array having a plurality of lenses arranged two-dimensionally as an optical instrument allowing uniform illumination.

Here, an optical system using the illumination unit 35 by the rod integrator 32 is shown in the figure, and the entire optical system of the projection display apparatus is described.

Light emitted from the lamp 401 as an optical instrument is collected at a reflector 402 which is light collecting instrument. A light flux emitted from an opening of the reflector 402 at this time is a light flux having a large difference in luminance between an area near the center of the light flux and a peripheral area. Then, a uniform flux is emitted from an opening on the exit side due to the rod integrator 32 described above. The light flux emitted from the rod integrator 32 propagates light to a position at which the reflection display element 41 capable of forming an image by light modulation, by the illumination unit 35 such as the lens 33, the mirror and the prism 36, such that the light becomes a light flux having a size suitable for an effective region of the reflection display element 41.

Traditionally, the white lamp 401 used as a general light source emits white light, but if white light illuminates the reflection display element 41 and a light flux modulated by the reflection display element 41 is projected onto a screen via the projection lens 51, only images of white and black, i.e. gray scales are output. Thus, in the case that color images are to be displayed, it is necessary to separate white light into three primary colors of red, green and blue and chromatically synthesize light fluxes of three colors again.

Thus, white light emitted from the white lamp 401 is separated into three primary colors of light by illuminating the display element with colors of red, green and blue in a time sequence by rotating a color separation filter called a color wheel 411 in a predetermined cycle within a period for display of one image, and images of respective colors formed by one reflection display element 41 are projected onto a screen during a period for illumination with light of respective colors to realize a color image. In FIG. 8, the color wheel 411 is inserted between the lens 31 and the rod integrator 32 as a color separation filter 21.

In this projection display apparatus, an image displayed within a period for formation of one screen (about 17 milliseconds for image display of NTSC and the like) produces an illusion as if images of different colors glittered at the same time because light caught by eyes is recognized or a certain time even if the image is an image displayed with different colors, and thereby a color image can be displayed.

In this way, a color image formed by the reflection display element 41 is displayed on a screen in a large size, brightly and highly uniformly.

In recent years, in the above-mentioned conventional optical system, instead of the white lamp 401 using mainly an ultra-high pressure mercury lamp, a projection display apparatus formed using a light source, called a solid light source such as a light emitting diode 1, emitting single-color light as shown in FIG. 10, or the like, is known (e.g. see "Performance of High Power LED Illuminators in Color Sequential Projection Displays"; Gerard Harbers, et at. IDW'03 pp 1585-1588). The projection display apparatus shown in FIG. 10 is comprised of a light source unit 4 comprising a red light emitting diode 1(*a*) and a lens 2(*a*) of collecting light fluxes emitted from the light source, a green light emitting diode 1(*b*) and a lens 2(*b*) of collecting light fluxes emitted from the light source, a blue light emitting diode 1(*c*) and a lens 2(*c*) of collecting light fluxes emitted from the light source, a cross prism 3 of synthesizing light fluxes of the light sources, an illumination unit 35 using lenses 31, 33, 34 allowing a light flux to be shaped and uniformed according to an illumination region, a rod integrator 32 allowing highly uniform illumination, and a prism 36 guiding light transmitted through the lens 34 to a reflection display element 41, the reflection display element 41 as a light modulation element modulating illuminating light, and a projection lens 51.

For solid light sources such as light emitting diodes 1(*a*) to 1(*c*) emitting single-color light, it is known that startup time taken until almost all light outputs corresponding to a power are emitted after the power is supplied, or startup time taken until almost all light outputs no longer exist after the supply of power is stopped is 1 microsecond or less, which is very short compared to the conventional white lamp 401. Namely, the light emitting diode has an advantage that the switching between light-up and light-out can be done instantaneously.

In addition, the light emitting diode can emit single-color light, and therefore it is unnecessary to take the trouble to chromatically separate emitted light. Thus, as shown in the light emitting diodes 1(*a*) to 1(*c*) shown in FIG. 10, light emitting diodes emitting red light (having a wavelength of about 600 to 700 nm), green light (having a wavelength of about 500 to 570 nm) and blue light (having a wavelength of about 430 to 490 nm), respectively, are used as light sources, and each diode is lighted up and lighted out repeatedly in a predetermined cycle under control from a control instrument (not shown), whereby a color image can be displayed as in the projection display apparatus of FIG. 8. It is known that this projection display apparatus does not require the color separation filter 21 such as the color wheel 411 for color separation used in the optical system having the conventional white lamp 401 as a light source, thus making it possible to form a projection display apparatus having a further optical system.

The above described projection display apparatus having, as a light source, solid light sources such as light emitting diodes 1(*a*) to 1(*c*) has the problems described below.

That is, in the projection display apparatus shown in FIG. 10, it is desired that a white color made by synthesizing three colors of red, green and blue should be adjusted so as to obtain light having a white color on a trail of black body radiation at a color temperature of 5000 to 10000 K, or very near the trail, and a white color significantly deviated from this range degrades the quality of a projected image. In this way, in light having a white color on a trail of black body radiation at a color temperature of 5000 to 10000 K, or very near the trail, the ratio of the radiant quantities of red, green and blue is often approximately 1:1:1 although it more or less varies depending on the main wavelength and the spectral bandwidth of a light source used. However, red light, green light and blue light are mutually different in brightness sensed by naked eyes. Generally, if the ratio of red light, green light and blue light having the same radiant intensity is represented by a ratio of brightness sensed by humans (hereinafter referred to as light amount), it is often red: green: blue=about 3:7:1, for example. Thus, when the white color is balanced, it is preferable that the ratio of the light amounts is, for example, red: green: blue=about 3:7:1.

On the other hand, there is a problem as described below.

The light amount of a light emitting diode emitting light from light emitting portions of almost same size, which is commercially available from Lumileds Co., Ltd. (U.S.), which is one of manufactures of light emitting diodes that can currently emit maximum outputs, is about 44 lumens for red, about 80 lumens for green and about 18 lumens for blue, and the ratio of the light amounts is red: green: blue=about 2:4:1 in which the light amounts of red and green light are small, and thus it does not coincide with the allocation ratio described above.

Thus, for light emission by such a light emitting diode, almost unique adjustment of the light amount is required in color synthesis, and an appropriate white color is obtained by adjusting the light amount in the following way.

A first control method adjusts the light intensities (referring to the momentary light amount as in the description below) of light emitting diodes of respective colors as shown in FIG. 11. Specifically, control is performed so that the light emitting diode of green is made to emit light at a maximum intensity, while the light intensities of the light emitting diode of red and the light emitting diode of blue are each lower than the maximum light intensity. The periods of light emission for red, green and blue light emitting diodes in FIG. 11 are the same with the period T for display of one image (about 17 milliseconds for image display of NTSC) divided into three equal periods. Under this condition, the light amounts of respective light are represented by the areas (products of light intensities and light emission periods) of a region 501 of the red light emitting diode 1(*a*), a region 502 of the green light emitting diode 1(*b*) and a region 503 of the blue light emitting diode 1(*c*), and the ratio thereof gives an allocation ratio allowing for a specific sensitivity of naked eyes.

However, in the adjustment shown in FIG. 11 in which the light emission period is fixed and the light intensity is made variable, the light intensity of the green light emitting diode 1(*b*) is determined to be a maximum light intensity and on the basis thereof, the light intensities of other light emitting diodes are determined. Thus, the maximum light intensity of the green light emitting diode 1(*b*) restricts the light intensities of all the light emitting diodes, and it is difficult to further increase the light amount in a state in which a high color reproducibility of white light is attained.

The value of the maximum light intensity of each color is a maximum light emission intensity obtained under conditions such as the amount of current within the range not destroying the light emitting portion of the light emitting element, product specifications, and the temperature requirement and the amount of current to be met for prolonging the lifetime.

Thus, a second control method described below is carried out. Control is performed so that all the light emitting diodes of red, green and blue are made to emit light at a maximum light intensity, while each light emitting diode is made to have a different light emission period and the green light emitting diode with a smaller light amount is made to have a longer light emission period, as shown in FIG. 12. Specifically, control is performed so that in a period T for display of one image, a light emission period Gt for the green light emitting diode is longer than one third of the period T for display of one image, light emission periods Rt and Bt for other light emitting diodes are shorter than the light emission period Gt (the light emission period for the blue light emitting diode is shorter than the light emission period for the red light emitting diode). As in FIG. 11, the light amounts of respective light sensed by naked eyes are represented by the areas of a region 511 of the red light emitting diode, a region 512 of the green light emitting diode and a region 513 of the blue light emitting diode, and the ratio thereof gives an allocation ratio (e.g. 3:7:1) allowing for a specific sensitivity of naked eyes.

For the example shown in FIG. 11 and the example shown in FIG. 12, the ratio of the areas (light amounts) for red, green and blue is the same, but the absolute value, i.e. the area of the regions (light amount) is greater in FIG. 12. Thus, a larger light amount can be obtained while the allocation ratio of respective colors is maintained.

However, in the adjustment shown in FIG. 12 in which the light emission period is made variable and the light intensity is fixed, it is the green light that is the greatest in light amount among red, green and blue colors as described above, and therefore if the lighting period for the green light emitting diode is prolonged for increasing the light amount of green in order to increase the brightness of emitted light as the projection display apparatus, the white color becomes a greenish white color. That is, lighting over a period longer than a predetermined lighting period has a problem of degradation in color reproducibility for the white color.

As described above, in a light source using a solid light source, such as light emitting diodes, capable of emitting single-color light, it is difficult to increase the light amount and also maintain a color reproducibility.

The present invention has been made in view of the above problems, and its object is to obtain a light emission method of a light source and a light emitting apparatus capable of increasing the light amount while maintaining a color reproducibility, a projection display apparatus using the same, and the like.

DISCLOSURE OF THE INVENTION

In order to achieve the above-mentioned object, the $1^{st}$ aspect of the present invention is a light emission method in which light as a light source for imaging is emitted using a first light source of emitting red light, a second light source of emitting green light and a third light source of emitting blue light, said method comprising:

a first light emitting step of making said first light source emit light in a first light emission period;

a second light emitting step of making said second light source emit light in a second light emission period;

a third light emitting step of making said third light source emit light in a third light emission period; and a fourth light emitting step of making said first light source, said second light source and said third light source emit light at the same time in a fourth light emission period, in a period for display of one image, wherein at least one duration compared to another duration of said first light emission period, said second light emission period and said third light emission period are respectively different.

Further, the $2^{nd}$ aspect of the present invention is the light emission method according to the $1^{st}$ aspect of the present invention, wherein at least any one of the below applies:

the light intensity of said first light source in said first light emission period being different from that in said fourth light emission period;

the light intensity of said second light source in said second light emission period being different from that in said fourth light emission period; and the light intensity of said third light source in said third light emission period being different from that in said fourth light emission period.

Further, the $3^{rd}$ aspect of the present invention is the light emission method according to the $2^{nd}$ aspect of the present invention, wherein a ratio of the light amount of said first light source in said first light emission period, the light amount of said second light source in said second light emission period and the light amount of said third light source in said third light emission period, and a ratio of the light amount of said first light source, the light amount of said second light source and the light amount of said third light source in said fourth light emission period are substantially the same.

Further, the $4^{th}$ aspect of the present invention is the light emission method according to the $1^{st}$ aspect of the present invention, wherein said first light emission period, said second light emission period, said third light emission period and said fourth light emission period are assigned for display of one image in a continuous or discontinuous manner.

Further, the $5^{th}$ aspect of the present invention is the light emission method according to the $4^{th}$ aspect of the present invention, wherein said first light emission period, said second light emission period and said third light emission period are assigned for display of one image in a continuous or discontinuous manner, and said fourth light emission period is assigned so as to be inserted in a period after one round of said first light emission period, said second light emission period and said third light emission period.

Further, the $6^{th}$ aspect of the present invention is the light emission method according to the $4^{th}$ aspect of the present invention, wherein said fourth light emission period is divided into divided periods, and the divided periods are assigned for display of one image so as to be inserted between at least one pair of light emission periods of said first light emission period, said second light emission period and said third light emission period.

Further, the $7^{th}$ aspect of the present invention is a light emitting apparatus comprising:

a first light source for emitting red light in a first and a fourth light emission periods in a period for display of one image;

a second light source for emitting green light in a second and a fourth light emission periods in a period for display of one image; and a third light source for emitting blue light in a third and a fourth light emission periods in a period for display of one image, wherein at least one duration compared to another duration of said first light emission period, said second light emission period and said third light emission period are different respectively.

Further, the $8^{th}$ aspect of the present invention is the light emitting apparatus according to the $7^{th}$ aspect of the present invention, wherein at least any one of the below applies:

the light intensity of said first light source in said first light emission period being different from that in said fourth light emission period;

the light intensity of said second light source in said second light emission period being different from that in said fourth light emission period; and the light intensity of said third light source in said third light emission period being different from that in said fourth light emission period.

Further, the $9^{th}$ aspect of the present invention is the light emitting apparatus according to the $7^{th}$ aspect of the present invention, wherein a ratio of the light amount of said first light source in said first light emission period, the light amount of said second light source in said second light emission period and the light amount of said third light source in said third light emission period, and a ratio of the light amount of said first light source, the light amount of said second light source and the light amount of said third light source in said fourth light emission period are substantially the same.

Further, the $10^{th}$ aspect of the present invention is the light emitting apparatus according to the $7^{th}$ aspect of the present invention, wherein said first light emission period, said second light emission period, said third light emission period and said fourth light emission period are assigned to said period for display of one image in a continuous or discontinuous manner.

Further, the $11^{th}$ aspect of the present invention is the light emitting apparatus according to the 7th aspect of the present invention, wherein said first light emission period, said second light emission period and said third light emission period are assigned to said display period in a continuous or discontinuous manner, and said fourth light emission period is assigned to a period after one round of said first light emission period, said second light emission period and said third light emission period.

Further, the $12^{th}$ aspect of the present invention is the light emitting apparatus according to the $10^{th}$ aspect of the present invention, wherein during said period for display of one image, said fourth light emission period is divided, and the divided periods are inserted between at least one pair of light emission periods of said first light emission period, said second light emission period and said third light emission period.

Further, the $13^{th}$ aspect of the present invention is a projection display apparatus comprising:

a first light source of emitting red light in a first and a fourth light emission periods during a period for display of one image;

a second light source of emitting green light in a second and a fourth light emission periods during a period for display of one image;

a third light source of emitting blue light in a third and a fourth light emission periods during a period for display of one image;

a light collecting system collecting light from said first, second and third light sources;

a light modulation element modulating light collected by said light collecting system; and a projection lens of projecting light modulated by said light modulation element.

According to the present invention, in a light source emitting single-color light represented by a solid light source such as a light emitting diode, a light amount is increased while a color reproducibility is maintained.

DESCRIPTION OF SYMBOLS

Figure 1:
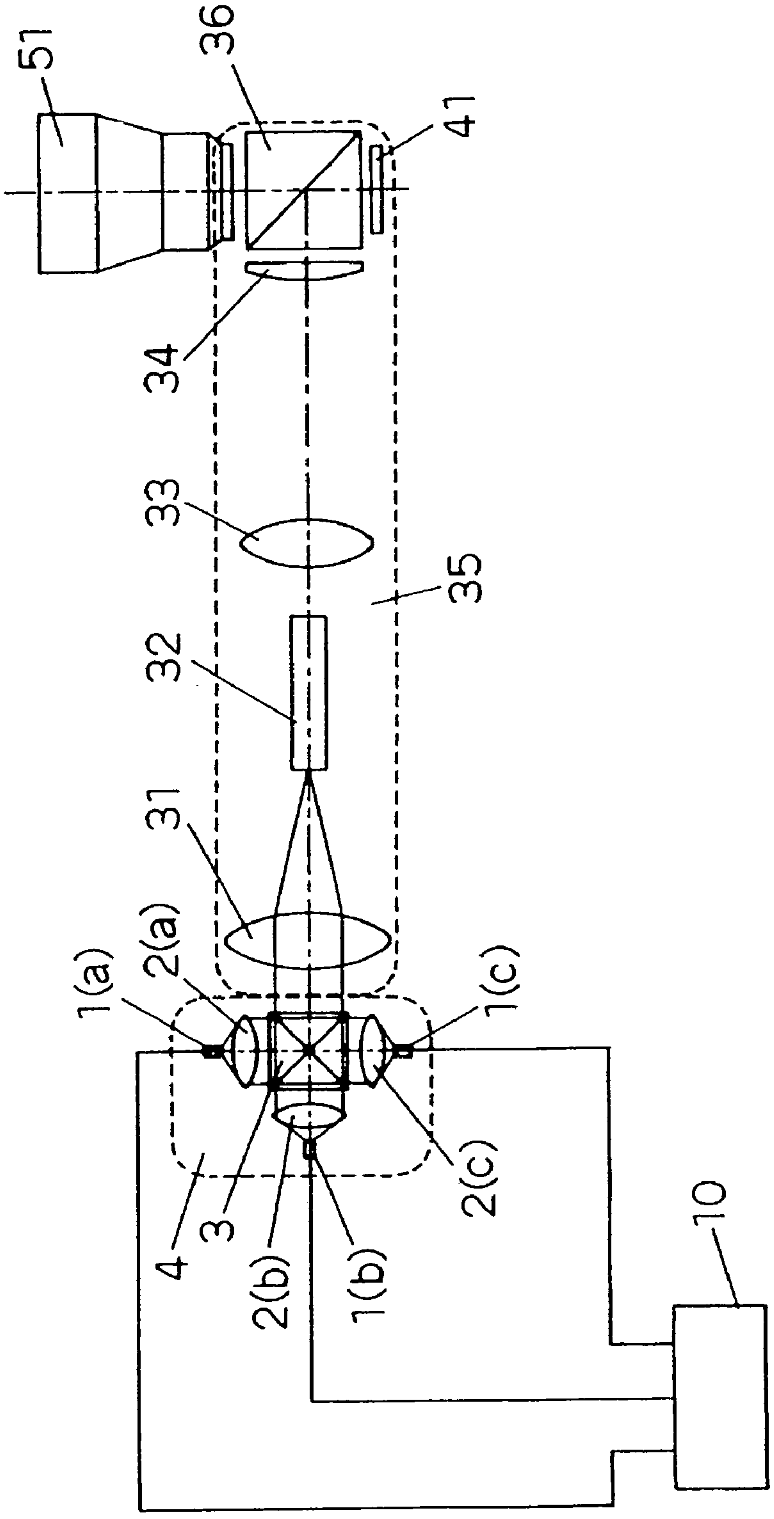
FIG. 1 is a view showing a first example of outlined configurations of a light emitting apparatus according to the embodiment of the present invention and a projection display apparatus including the light emitting apparatus.

1(*a*) red light emitting diode
1(*b*) green light emitting diode
1(*c*) blue light emitting diode
2(*a*) lens
2(*b*) lens
2(*c*) lens
3 cross prism
4 light emitting unit
10 control instrument
21 color separation filter
31 lens
32 rod integrator
33 lens
34 lens
35 illumination unit
36 prism
41 display element
51 projection lens
101 region representing the light amount shown by a product of a light intensity and a lighting period during emission of single-color light by the red light emitting diode 1(*a*)
102 region representing the light amount shown by a product of a light intensity and a lighting period during emission of single-color light by the green light emitting diode 1(*b*)
103 region representing the light amount shown by a product of a light intensity and a lighting period during emission of single-color light by the blue light emitting diode 1(*c*)
104 region representing the light amount shown by a product of a light intensity and a lighting period during simultaneous emission of light of three colors by the red light emitting diode 1(*a*)
105 region representing the light amount shown by a product of a light intensity and a lighting period during simultaneous emission of light of three colors by the green light emitting diode 1(*b*)
106 region representing the light amount shown by a product of a light intensity and a lighting period during simultaneous emission of light of three colors by the blue light emitting diode 1(*c*).

BEST MODE FOR CARRYING OUT THE INVENTION

Embodiments of the present invention will be described below with reference to the drawings.

Embodiments

An outlined configuration of a projection display apparatus according to the embodiment of the present invention is shown in FIG. 1.

The apparatus of FIG. 1 is comprised of a light source unit 4 comprising a red light emitting diode 1(*a*) as a red light source and a lens for red light 2(*a*) of collecting light fluxes emitted from the red light emitting diode 1(*a*), a green light emitting diode 1(*b*) as a green light source and a lens for green light 2(*b*) of collecting light fluxes emitted from the green light emitting diode 1(*b*), a blue light emitting diode 1(*c*) as a blue light source and a lens for blue light 2(*c*) of collecting light fluxes emitted from the blue light emitting diode 1(*c*), a cross prism 3 of synthesizing the light fluxes emitted from the light emitting diodes 1(*a*), 1(*b*) and 1(*c*), and a control instrument 10 controlling the lighting period and the light intensity during lighting for each of the red light emitting diode 1(*a*), the green light emitting diode 1(*b*) and the blue light emitting diode 1(*c*), an illumination unit 35 using lenses 31, 33, 34 allowing a light flux to be shaped and uniformed according to an illumination region, a rod integrator 32 allowing highly uniform illumination, and a prism 36 guiding light transmitted through the lens 34 to a reflection display element 41, the reflection display element 41 as a light modulation element modulating illuminating light, and a projection lens 51.

In the light source unit 4, the light sources of three colors of the light emitting diodes 1(*a*), 1(*b*) and 1(*c*) are lighted in a time division manner, superimposition of images each displayed within a period for formation of one screen (about 17 milliseconds for image display of NTSC and the like) leads to a color image, and light formed by synthesizing three colors or light formed by superimposing three colors takes on a white color.

Instead of the light emitting diodes 1(*a*), 1(*b*) and 1(*c*), light sources emitting single-color light and having reduced rise and fall time, for example solid lasers such as a semiconductor laser and an Nd:YAG laser and gas lasers such as an Ar laser may be used. Similarly, solid light sources having reduced rise and fall time and allowing instantaneous light-up and light-out within a period for formation of one screen (about 17 milliseconds), and other light sources may be used.

FIG. 1 shows the case where light fluxes emitted from the light emitting diodes 1(*a*), 1(*b*) and 1(*c*) of three primary colors are used for illumination of the reflection display element 41, and if emitted simultaneously, light fluxes of three colors collected using the lenses 2(*a*), 2(*b*) and 2(*c*) for respective colors, respectively, are introduced into the illumination unit 35 as white color chromatically synthesized at the cross prism 3.

The light fluxes introduced into the illumination unit 35 are collected at the lens 31, pass through a uniforming and illuminating instrument such as the hallow cylindrical rod integrator 32 formed from a glass column or laminated mirrors, and an optical instrument such as the lens 33, and are orthogonally reflected at the prism 36 to illuminate the reflection display element 41. In the reflection display element 41, light is reflected in a light modulated state, passes through the prism 36, and is projected onto a screen (not shown) via the projection lens 51. In this way, an enlarged color image is displayed.

In the configuration described above, the light source unit 4 and the control instrument 10 correspond to a configuration including a light source and a light emitting apparatus of the present invention, the red light emitting diode 1(*a*) corresponds to a first light emitting instrument of the present invention, the green light emitting diode 1(*b*) corresponds to a second light emitting instrument of the present invention, blue light emitting diode 1(*c*) corresponds to a third light emitting instrument of the present invention, and the control instrument 10 corresponds to a control instrument of the present invention. The lenses 2(*a*), 2(*b*) and 2(*c*) for respective colors, the cross prism 3, the lenses 31, 33 and 34, the prism 36 and the rod integrator 32 constitute a light collecting system of the present invention, the reflection display element 41 corresponds to a light modulation element of the present invention, and the projection lens 51 corresponds to a projection instrument of the present invention.

Figure 2:
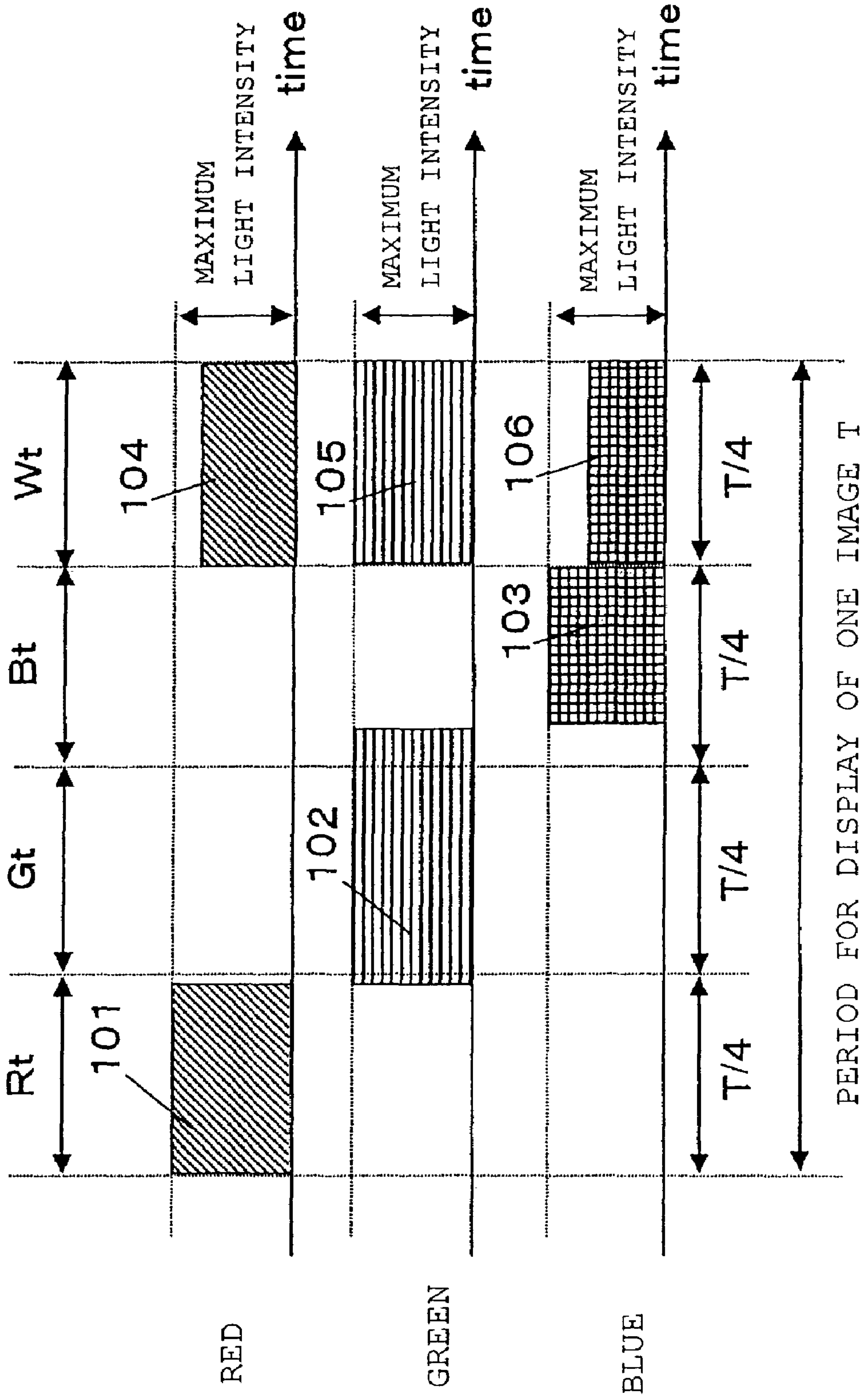
FIG. 2 is a view showing a first example of the intensity and time schedule of light of each color output from the light emitting apparatus included in the projection display apparatus according to the embodiment of the present invention.

Control operations by the control instrument 10 of controlling he light intensity and the lighting period for the red light emitting diode 1(*a*), the green light emitting diode 1(*b*) and the blue light emitting diode 1(*c*) of the light source unit 4 of the projection image display apparatus of the embodiment of the present invention having the above configuration will be described with reference to FIG. 2, and thereby one embodiment of a light emission method of the present invention will be described. FIG. 2 shows a first example of the intensity and time schedule of light of each color output from the projection display apparatus under control by the control instrument 10.

As shown in FIG. 2, the control instrument 10 divides a period T for display of one image into four equal periods each represented by T/4, assigns the sum of first three periods of the divided periods to periods Rt, Gt and Bt for the red light emitting diode 1(*a*), the blue light emitting diode 11(*c*) and the green light emitting diode 1(*b*) of three primary colors, respectively, to emit light individually in a time division manner, and assigns the last one period to a period Wt for the red light emitting diode (8*a*), the blue light emitting diode 11(*b*) and the green light emitting diode 1(*c*) of three primary colors to be lighted at the same time.

At this time, the first three periods are treated as one period on the whole, and it is not necessary to light the single-color light emitting diodes for the same period. As shown in FIG. 2, for the period for single light emission of single-color light, the period Gt for single light emission by the green light emission diode 1(*b*) is the longest, i.e. T/4 or longer, the period Rt for single light emission by the red light emitting diode 1(*a*) is the second longest, and the period Bt for single light emission by the blue light emitting diode 1(*c*) is the shortest as in the example of the conventional projection display apparatus of FIG. 12. In FIG. 2, the period Rt for single light emission by the red light emitting diode 1(*a*) corresponds to a first light emission period of the present invention, the period Gt for single light emission by the green light emitting diode 1(*b*) corresponds to a second light emission period of the present invention, and the period Bt for single light emission by the blue light emitting diode 1(*c*) corresponds to a third light emission period of the present invention. This matching relation is common in the examples described below.

Then, in the last one period wt, the red light emitting diode 1(*a*), the blue light emitting diode 11(*c*) and the green light emitting diode 1(*b*) emit light at the same time, and therefore mixed white light is emitted from the light source unit 4. Thus, for the period for display of one screen on the whole, single-color light of red, green and blue and white light are each projected in a time division manner. The period Wt for simultaneous light emission by the red light emitting diode 1(*a*), the green light emitting diode 1(*b*) and the blue light emitting diode 1(*b*) corresponds to a fourth light emission period of the present invention. This matching relation is also common in the examples described below.

Figure 12:
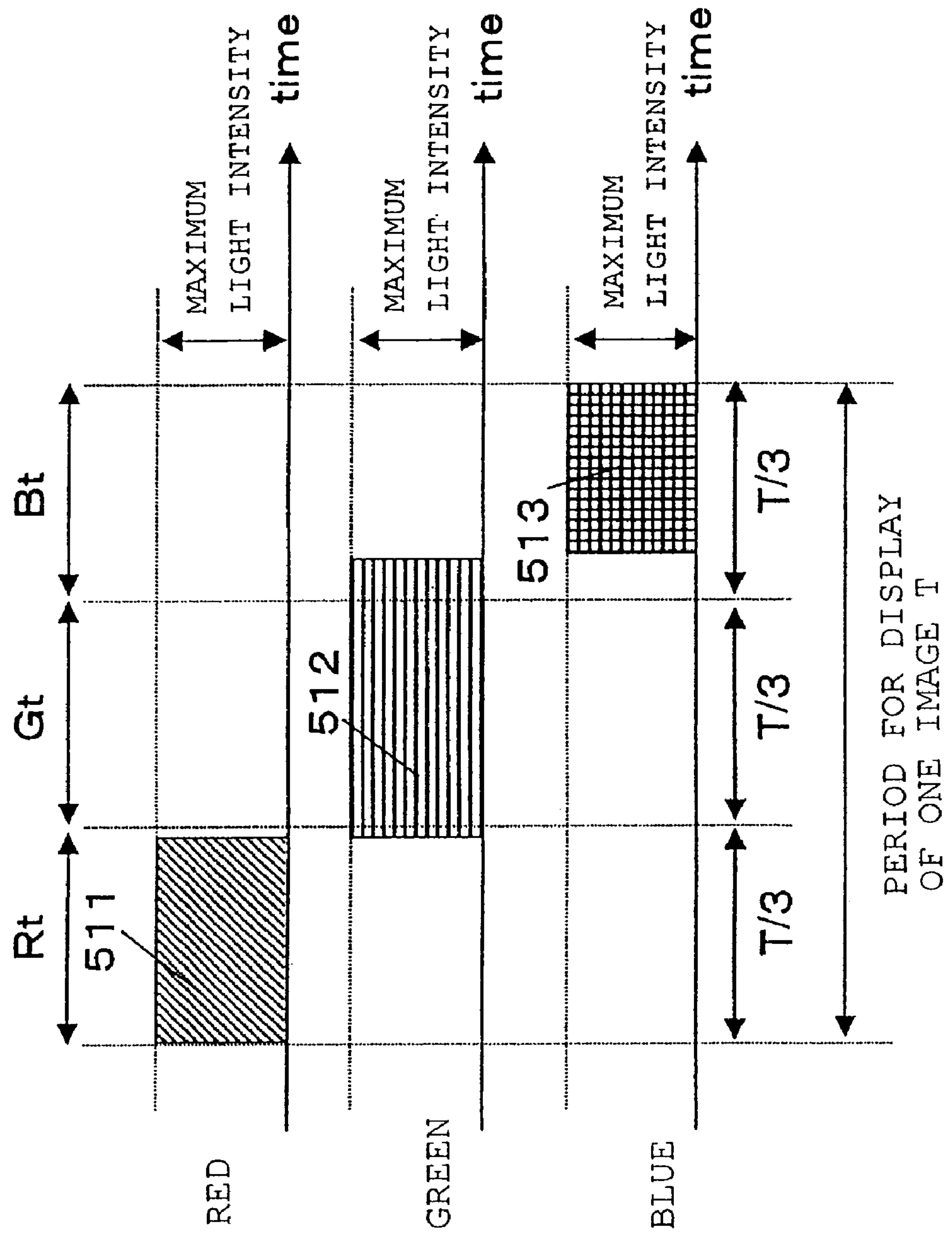
FIG. 12 is a view showing a second example of the intensity and time schedule of light of each color output from the conventional display apparatus.

As described in the example of the conventional projection display apparatus of FIG. 12, in white light with formed by superimposing single-color light of three primary colors emitted in a time division manner, the period for single light emission of each single-color light is changed and the period for single light emission by the green light emitting diode is set to be the longest for ensuring a high color reproducibility, but if light is emitted for a light emission period longer than a predetermined light emission period for the green light emitting diode, which allows an appropriate white color to be obtained, in order to obtain a larger light amount, the influence of the green color becomes significant in the white color, and thus the color reproducibility is degraded.

In contrast to this, according to this embodiment, the period Wt for simultaneous light emission for super imposing mixed white light is provided. As a result, the sum of the light amounts in the period T for display of one image (regions 101, 102, 103, 104, 105 and 106 in FIG. 2) can be substantially increased, and the color reproducibility can be maintained without considerably disturbing the balance of the respective colors.

Further, in this embodiment, the light intensity of each light emitting diode is made different for the case where the light emitting diodes individually emit light and the case where the light emitting diodes of three colors emit light at the same time only by this action, the brightness can be increased while a white color of high color reproducibility is maintained even if the lighting period for the green light emitting diode is prolonged. This will be described below.

The case is considered where the above-mentioned light diode having a light output is used.

Where the light amount when light is emitted with a single color on the basis of the period T for display of one image is 44 lumens for the red light emitting diode 1(*a*), 80 lumens for the green light emitting diode 1(*b*) and 18 lumens for the blue light emitting diode 1(*c*), the brightness of each color is 11 lumens for red, 20 lumens for green and 4.5 lumens for blue provided that the lighting period for each light emitting diode is equally T/4.

At this time, in order that the balance of three colors of a white color of high color reproducibility output by the projection display apparatus is such that the ratio of the light amounts of light of three colors is, for example, red: green: blue=3:7:1, the light emission period for each single-color light is adjusted so that the light emission period for the red light emitting diode 1(*a*) is reduced from T/4 to 97% thereof, the light emission period for the green light emitting diode 1(*b*) is increased from T/4 to 124% thereof, and the light emission period for the blue light emitting diode 1(*c*) is reduced from T/4 to 79% thereof. As a result, the light amount of each single-color light is 10.6 lumens for red, 24.9 lumens for green and 3.6 lumens for blue, and it can be understood that the ratio of the light amounts of light of three colors is red: green: blue=about 3:7:1. The ratio of the light amounts is shown as a ratio of the areas of regions 101, 102 and 103 in the figure.

In this way, for the light amount in the periods Rt, Gt and Bt for single light emission, light is emitted in a state in which the intensity of each single-color light is at the maximum, and the period over which each single-color light emitting diode emits light is adjusted to obtain a maximum brightness with a desired color balance. This adjustment is same as that in the example of the conventional projection display apparatus of FIG. 12.

On the other hand, in the period wt for emitting light of three colors at the same time, which is subsequently carried out, the periods for the respective single-color light emitting diodes should be the same. Thus, if the respective single-color light emitting diodes all emit light at a maximum light intensity, the ratio of the light amounts of light of three colors in mixed white color is red: green: blue=2.4:4.4:1 which is identical to the ratio of 44 lumens for red, 80 lumens for green and 18 lumens for blue, which is a maximum output for each single-color light, and the ratio of red: green: blue=3:7:1 which is the ratio of the light amounts of light of three colors in mixed white color output by the projection display apparatus is disturbed.

Thus, if the light intensities of the red and blue light emitting diodes so that the light intensity of the red light emitting diode 1(*a*) is reduced to 77.9% of the maximum light intensity, and the light intensity of the blue light emitting diode 1(*c*) is reduced to 63.5% of the maximum light intensity, while the light intensity of the green light emitting diode 1(*b*) is kept at the maximum light intensity, the ratio of the light amounts of light of three colors is red: green: blue=44×0.779:80×1.0:18×0.635≦3:7:1. Therefore, substantially same values are obtained for the ratio of the light amounts in the period Wt for simultaneous light emission by the respective light emitting diodes and the ratio of the light amounts in the periods Rt, Gt and Bt for single light emission by the respective light emitting diodes, and thus mixed white light of high color reproducibility can be obtained. The ratio of the light amounts in the period Wt for simultaneous light emission is shown as a ratio of areas of regions 104, 105 and 106 in the figure.

As a result, the color reproducibility is kept high in the period T for display of one image both in white light by single time sequence light emission of red light, green light and blue light in the prior period of 3T/4 and mixed white color in the latter period of T/4, and therefore white light with an increased light amount while the color reproducibility is kept high over the entire period T for display of one image.

As described above, according to this embodiment, the periods Rt, Gt and Bt for the red light emitting diode 1(*a*), the green light emitting diode 1(*b*) and the blue light emitting diode 1(*c*), respectively, to emit light with single colors, and the period wt for the light emitting diodes to emit light at the same time are assigned within the period T for display of one image, and the light emission period is adjusted in the periods for single light emission with single colors and the light intensities are adjusted in the period for simultaneous light emission so that the ratio of the light amounts is substantially the same for the periods Rt, Gt and Bt for light emission with single colors and the period wt for simultaneous light emission, whereby the brightness can be increased while a white color of high color reproducibility is maintained.

In the above description, the period T for display of one image is divided into four equal periods, the prior 3T/4 is assigned to the light emission period for each monochromic, and the remaining T/4 is assigned to the period emitting light of three colors at the same time, but it is not required to specifically employ this allocation. And allocation of time for the light emission period for single-color light and the period for emitting light of three colors at the same time may be arbitrarily changed.

Figure 3:
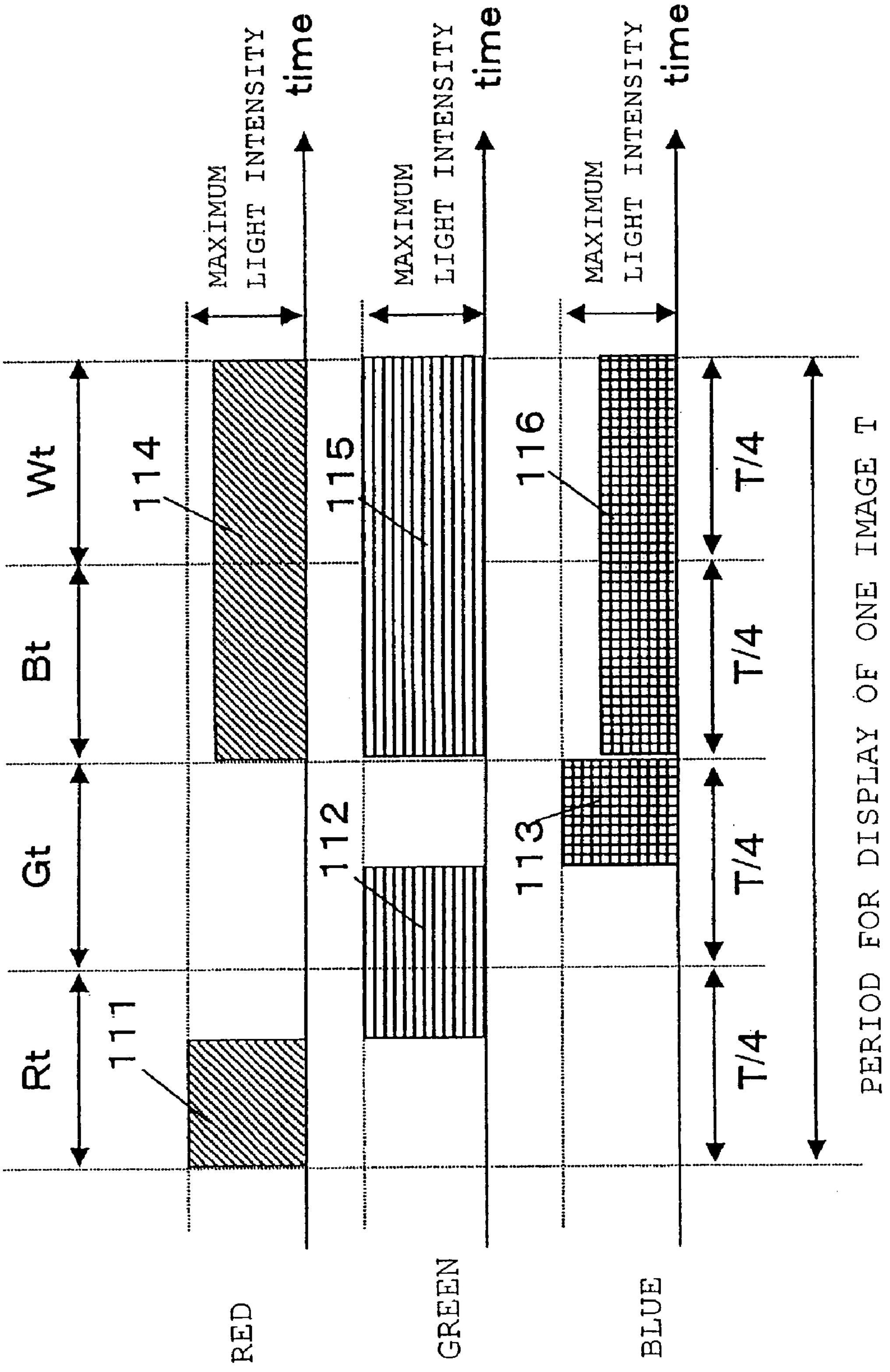
FIG. 3 is a view showing a second example of the intensity and time schedule of light of each color output from the light emitting apparatus included in the projection display apparatus according to the embodiment of the present invention.

FIG. 3 shows an example in which the periods Rt, Gt and Bt for simultaneous emission of light of three colors for projecting mixed white light are increased to ½ of the display period, and the remaining half period is assigned to the light emission period Wt for display of single-color light. In this case, the ratio of the light amounts of respective single-color light represented by the ratio of the areas of regions 111, 112 and 113 and the ratio of the light amounts of respective single-color light in mixed white light, represented by the ratio of the areas of regions 114, 115 and 116 are substantially the same in the figure, and a projection display apparatus capable of projecting an image having an extremely large peak output of white color while maintaining a high color reproducibility can be provided.

Figure 4:
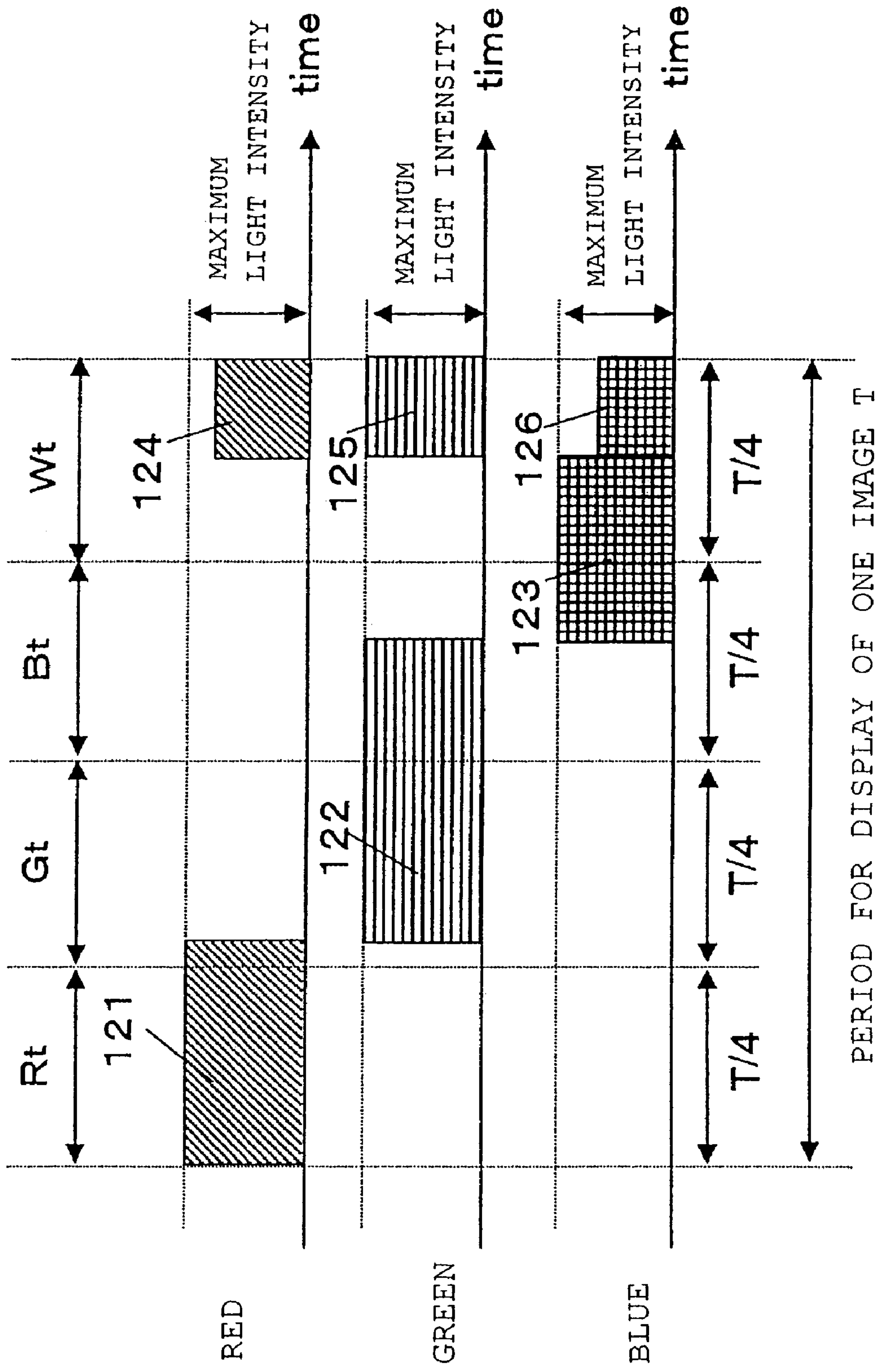
FIG. 4 is a view showing a third example of the intensity and time schedule of light of each color output from the light emitting apparatus included in the projection display apparatus according to the embodiment of the present invention.

Next, FIG. 4 shows an example in which the light emission periods Rt, Gt and Bt for display of single-color light are increased to 7/8 of the period T for display of one image, and the remaining period of T/8 is assigned to the period Wt for simultaneous emission of light of three colors. In this case, the ratio of the light amounts of respective single-color light represented by the ratio of the areas of regions 121, 122 and 123 and the ratio of the light amounts of respective single-color light in mixed white light, represented by the ratio of the areas of regions 124, 125 and 126 are substantially the same, and a projection display apparatus capable of projecting an image in which a peak output of white color decreases, but the light amount of display with a single color increases and a display portion with a single color is extremely bright while maintaining a high color reproducibility can be provided.

Further, in the above description presented with reference to FIGS. 2 to 4, the order of light emission by the light emitting diodes with in the period T for display of one image is single light emission by the red light emitting diode 1(*a*), followed by single light emission by the green light emitting diode 1(*b*), followed by single light emission by the blue light emitting diode 1(*c*), followed by emission of light of three colors at the same time, but the order of light emission is not limited thereto. As long as control of the above four types of lighting of light emitting diodes are each carried out with the light emission period and the light intensity adjusted as described above within the period T for display of one image, the light emitting diodes may be lighted in no particular order.

Figure 5:
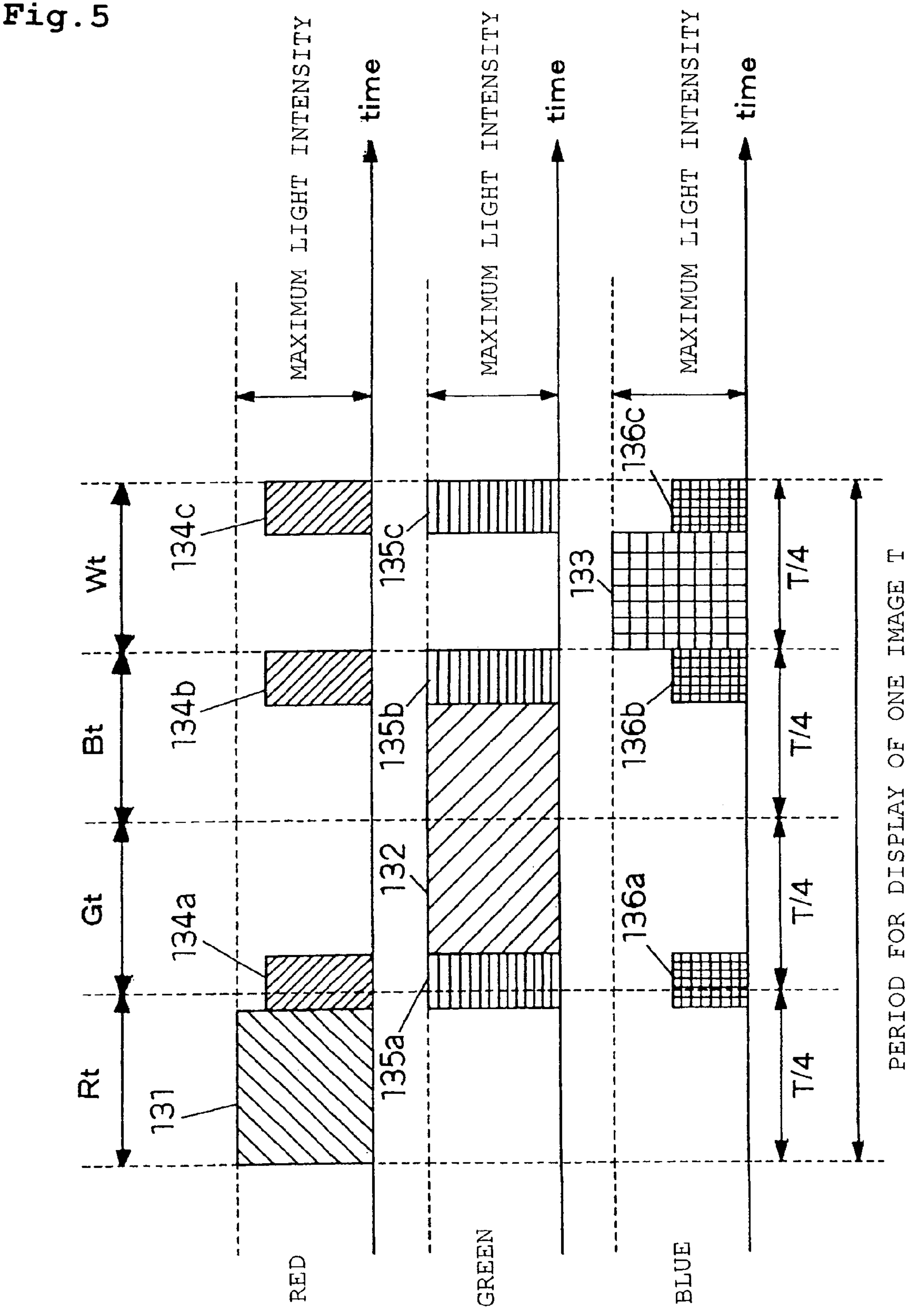
FIG. 5 is a view showing a fourth example of the intensity and time schedule of light of each color output from the light emitting apparatus included in the projection display apparatus according to the embodiment of the present invention.

Further, in the above description, single light emission with each single-color light is carried out continuously, and simultaneous emission of light of three colors is carried out continuously in the period T for display of one image, but each light emission maybe carried out discontinuously. For example, as shown in FIG. 5, the period for simultaneous emission of light of three colors is divided into three equal periods, and the divided periods are inserted between the period for single light emission by the red light emitting diode 1(*a*) and the period for single light emission by the green light emitting diode 1(*b*), between the period for single light emission by the green light emitting diode 1(*b*) and the period for single light emission by the blue light emitting diode 1(*c*), and between the period for single light emission by the blue light emitting diode 1(*c*) and the period for single light emission by the red light emitting diode 1(*a*), respectively. In this case, the ratio of the light amounts of respective single-color light represented by the ratio of the areas of regions 131, 132 and 133 and the ratio of the light amounts of respective single-color light in mixed white color, represented by the ratio of the areas of regions (134*a*+134*b*+134*c*), (135*a*+135*b*+135*c*) and (136*a*+136*b*+136*c*) are substantially the same, and a projection display apparatus capable of equally dispersing a period for display of mixed white color displaying a gray scale screen having no significant color information within the period T for display of one image to project an image excellent in quality while maintaining a high color reproducibility can be provided.

Figure 6:
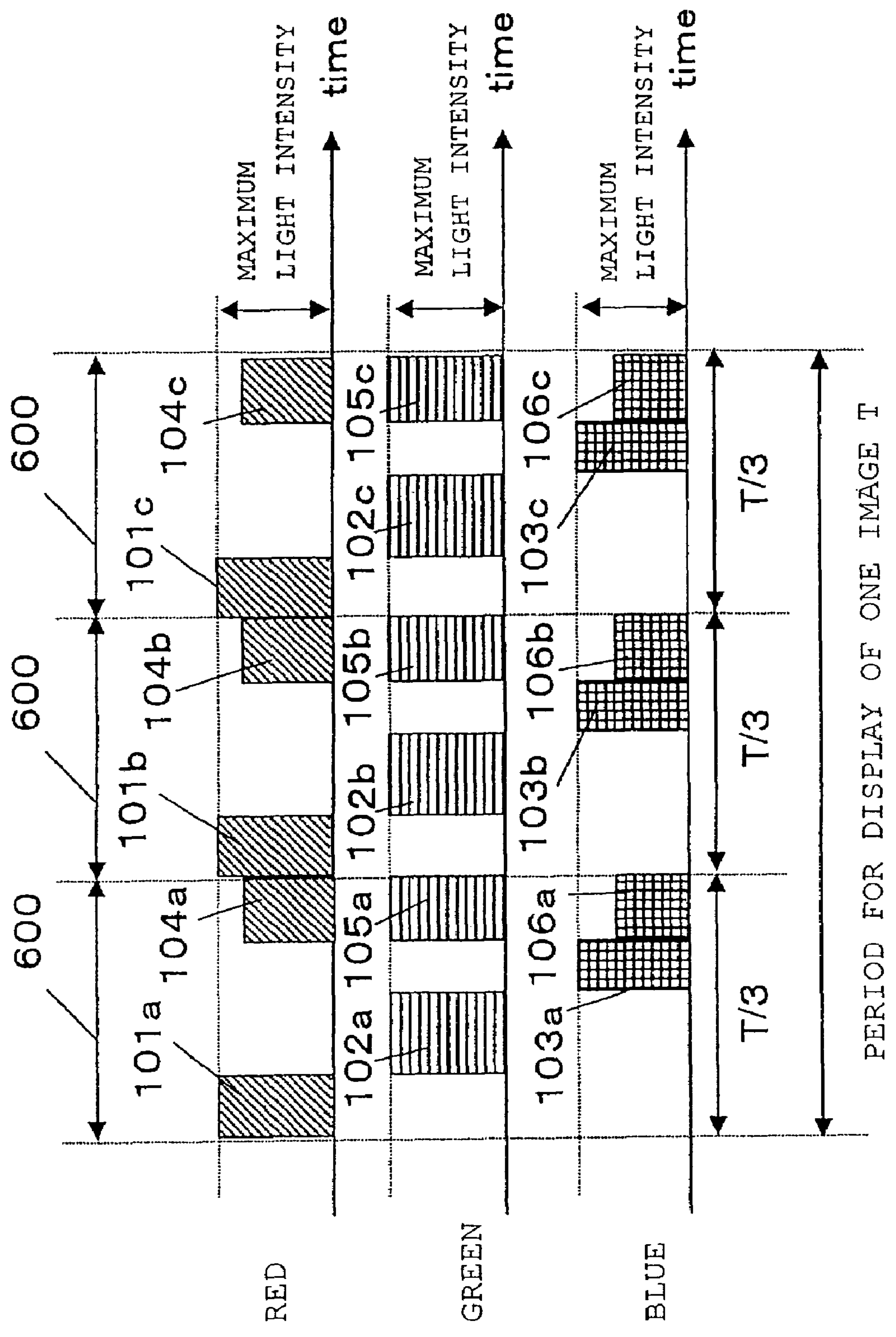
FIG. 6 is a view showing a fifth example of the intensity and time schedule of light of each color output from the light emitting apparatus included in the projection display apparatus according to the embodiment of the present invention.

Further, the period for simultaneous emission of light of three colors may be divided into four or more equal periods. In addition, the period for single light emission by the red light emitting diode 1(*a*), the period for single light emission by the green light emitting diode 1(*b*) and the period for single light emission by the blue light emitting diode 1(*c*) may be divided into two or more equal periods. FIG. 6 shows an example in which the period is divided into three periods, and in the display period of T/3 obtained by dividing the period T for display of one image, the period for single light emission by the red light emitting diode 1(*a*), the period for single light emission by the green light emitting diode 1(*b*) and the period for single light emission by the blue light emitting diode 1(*c*) and the period for simultaneous emission of light of three colors are completed, and this completed cycle 600 is repeated three times within the display period T for one image. In this case, the ratio of respective single-color light in the period for single light emission within the period T for display of one image, represented by the ratio of the areas of regions (101*a*+101*b*+101C), (102*a*+102*b*+102*c*) and (103*a*+103*b*+103C) and the ratio of the light amounts of single-color light in the period for simultaneous emission of light of three colors within the period T for display of one image, represented by the ratio of the areas of regions (104*a*+104*b*+104*c*), (105*a*+105*b*+105*c*) and (106*a*+106*b*+106*c*) are kept substantially the same. Further, it is preferable that the ratio of the light amounts of respective single-color light in the period for single light emission within each cycle 600 and the ratio of the light amounts of respective single-color light in the period for simultaneous emission of light of three colors within each cycle 600 are substantially the same. In FIG. 6, it is preferable that the ratio of the areas of regions 101*a*, 102*a* and 103*a* and the ratio of the areas of regions 104*a*, 105*a* and 106*a* are substantially the same, the ratio of the areas of regions 101*b*, 102*b* and 103*b* and the ratio of the areas of regions 104*b*, 105*b* and 106*b* are substantially the same, and the ratio of the areas of regions 101*c*, 102*c* and 103*c* and the ratio of the areas of regions 104*c*, 105*c* and 106*c* are substantially the same.

Further, it is preferable that the ratio of the light amounts of respective single-color light in the period for single light emission within all the cycles 600 within the period T for display of one image and the ratio of the light amounts of respective single-color light in the period for simultaneous emission of light of three colors within all the cycles 600 within the period T for display of one image are substantially the same. In FIG. 6, it is preferable that the ratio of the areas of regions 101*a*, 102*a* and 103*a*, the ratio of the areas of regions 104*a*, 105*a* and 106*a*, the ratio of the areas of regions 101*b*, 102*b* and 103*b*, and the ratio of the areas of regions 104*b*, 105*b* and 106*b*, the ratio of the areas of regions 101*c*, 102*c* and 103*c*, and the ratio of the areas of regions 104*c*, 105*c* and 106*c* are all substantially the same.

Further, division of the period for single light emission of each single-color light, division of the period for simultaneous emission of light of three colors, and division into respective cycles may be unequal division, instead of equal division, and the durations of the divided periods may be different.

In short, the period for single light emission by the red light emitting diode 1(*a*), the period for single light emission by the green light emitting diode 1(*b*), the period for single light emission by the blue light emitting diode 1(*c*), and the period for simultaneous light emission by the three light emitting diodes should be effected within the period T for display of one image, and individual light emission periods should be assigned in a continuous or discontinuous (equally dividing or unequally dividing) manner.

Further, in the above description using FIGS. 2 to 5, the ratios of the light amounts in the period for single light emission by the red light emitting diode 1(*a*), the period for single light emission by the green light emitting diode 1(*b*) and the period for single light emission by the blue light emitting diode 1(*c*), and the ratio of the light amounts of respective single-color light in mixed white light by simultaneous light emission by the respective light emitting diodes are substantially the same, but the present invention is not limited thereto. That is, in the present invention, if a lack of the light amount of single-color light displayed in a time division manner can be compensated with mixed white color when single-color light of red, green and blue is emitted in a time division manner, the intended purpose can be achieved to some degree, and therefore the ratio of the light amounts in mixed white light and the ratio of the light amounts in the period for single light emission by each light emitting diode maybe different. For example, the ratio of the light amounts in mixed white light may be red: green: blue=2.4:4.4:1 which is a ratio obtained when each light emitting diode emits light at a maximum light intensity, while the ratio of the light amounts in the period for single light emission by each light emitting diode is kept at red: green: blue=3:7:1. In short, for achieving a high color reproducibility during color synthesis, the ratio of the light amounts should be determined such that the light amount of a light emitting diode of a color having an insufficient brightness is greater than the light amount of a light emitting diode of a different color.

Further, in the examples shown in FIGS. 2 to 5, the ratio of the light amounts in the period for single light emission by each light emitting diode within period T for display of one image is red: green: blue=3:7:1, and therefore the ratio of the light amounts of single-color light in mixed white color maybe arbitrarily changed to the extent that the light amount of the green light emitting diode 1(*b*) is kept the largest in the ratio of the light amounts in the entire period for display of at least one image. At this time, the ratio of the light amounts in the period for single light emission by each light emitting diode may be changed while the ratio of the light amounts in mixed white light by simultaneous light emission by the respective light emitting diodes is fixed at red: green: blue=3:7:1.

In the above description, all the light emitting diodes emit light at a maximum light intensity within the period for single light emission by each light emitting diode, but in the present invention, the respective light intensities may be changed in the period for single light emission by each light emitting diode. At this time, the ratio of the light amounts in the period for single light emission by each light emitting diode and the ratio of the light amounts in mixed white light may be arbitrarily determined.

As described above, in the present invention, at least one of the periods for light emission by the red light emitting diode 1(*a*), the green light emitting diode 1(*b*) and the blue light emitting diode 1(*c*) is made different from others in the period for single lighting of each light emitting diode, assigned within the period for display of one image, and to this period is assigned the period for simultaneous light emission by the red light emitting diode 1(*a*), the green light emitting diode 1(*b*) and the blue light emitting diode 1(*c*). Adjustment of the light emission period and adjustment of the light intensity in the period for single light emission by each light emitting diode may be carried out not in an alternative manner but at the same time.

In the above description, a light emission control method in a situation in which the output of green light is low compared to a ratio of red, green and blue in good balance for obtaining an appropriate white color when referring to the light amount of the light emitting diode of Lumileds Co., Ltd. (U.S.) is shown, but when a product having a different light emission efficiency and introducible power, or a product other than products of Lumileds Co., Ltd. (U.S.) is used, a light source other than the green light source may emit light at a maximum light intensity because the light amount of red or blue light is small compared to a ratio of red, green and blue in good balance for obtaining an appropriate white color.

In FIG. 1, three lenses 31, 33 and 34, the rod integrator 32 and the prism 36 are shown as the illumination unit 35, and lenses in the optional path and a prism for bending an optical path are shown as an optical instrument of converting light introduced into the illumination unit 35 into illuminating light having a shape and uniformity consistent with a size suitable for illuminating the reflection display element 41 to be illuminated, shown in the illumination unit 35, an optical system having no lens, an optical system having a plurality of single lenses in combination, or an optical system including an optical instrument such as a mirror (although not shown in the figure) may be implemented as a light collecting system.

In FIG. 1, the light source unit 4 chromatically synthesizing light emitted from the light emitting diodes 1(*a*) to 1(*c*) of three colors and collected at he lenses 2(*a*) to 2(*c*), by the cross prism 3 is shown, but the light emitting apparatus of the present invention may have a configuration in which light fluxes of respective colors are synthesized by a color filter such as a dichroic mirror.

The period for display of one image, to which the periods for single light emission by the red light emitting diode 1(*a*), single light emission by the green light emitting diode 1(*b*), single light emission by the blue light emitting diode 1(*c*) and simultaneous light emission by the respective light emitting diodes are assigned, is about 17 milliseconds, i.e. a period for display of one image in NTSC image display, but a period for display of one image for PAL or other image signals may be adopted. That is, the duration of the period for display of one image is not limited as long as the above periods can be assigned within a period for the reflection display element 41 to display one screen.

In the above configuration, for obtaining white light using light emitting diodes as a light generating instrument of emitting single-color light, light emitted from the three types of light emitting diodes of red, green and blue is synthesized, but the white light is formed by such a light emission which may be such that light close to ultraviolet light or light having a wavelength in the ultraviolet range is emitted, when light having such a wavelength is incident, light is emitted from a fluorescent material fluorescing red, green and blue. Not only light of three colors of red, green and blue, but also light of four or more colors, such as red, yellow, green, cyan and blue, may be synthesized.

Figure 7:
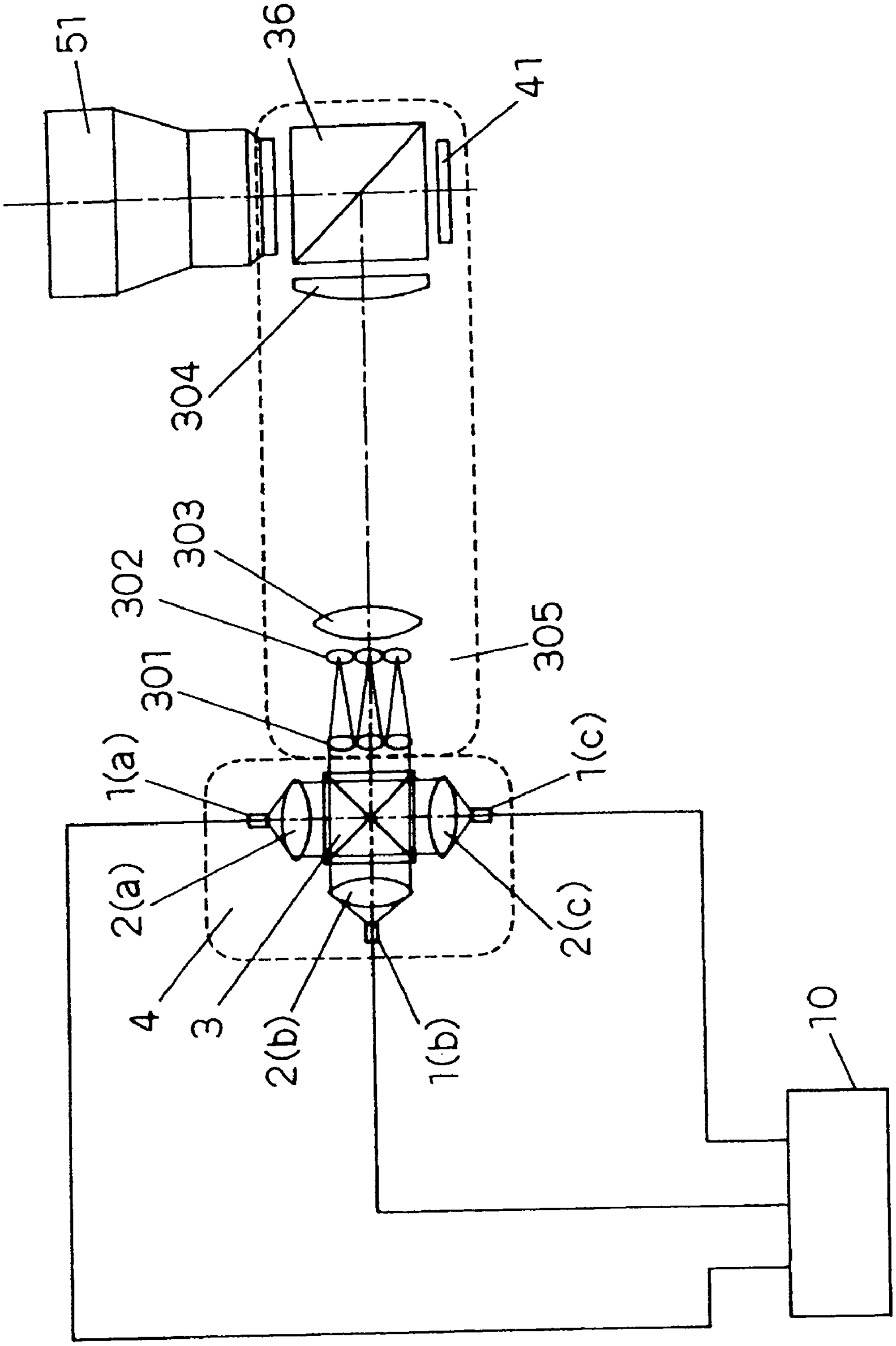
FIG. 7 is a view showing a second example of an outlined configuration of the light emitting apparatus included in the projection display apparatus according to the embodiment of the present invention.
Figure 8:
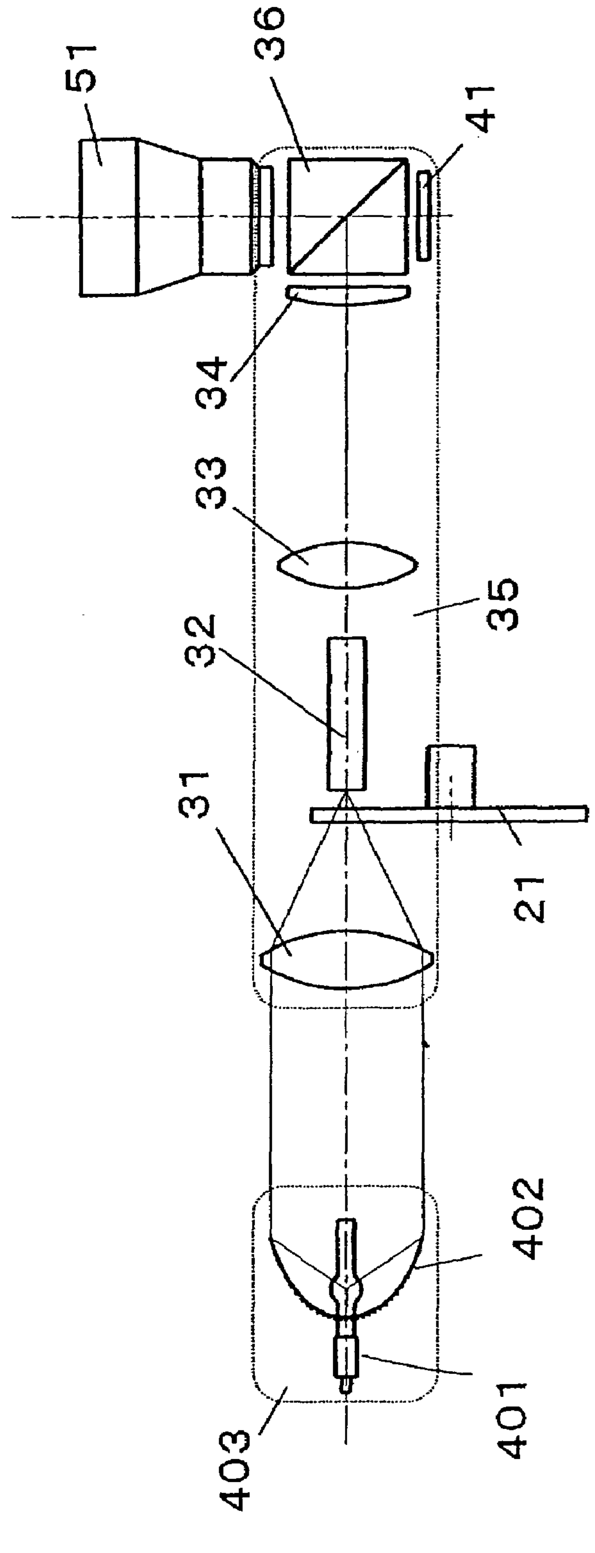
FIG. 8 is a view showing a first example of an outlined configuration of the conventional projection display apparatus.
Figure 9:
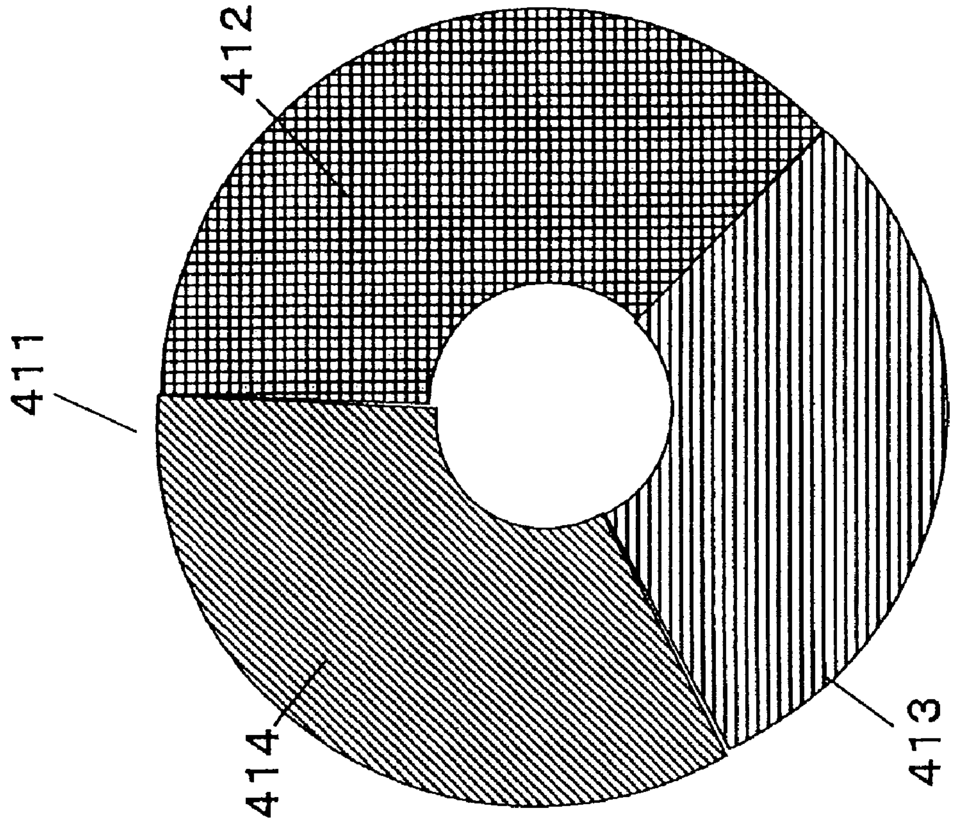
FIG. 9 is a view showing one example of an outlined configuration of a color wheel for use in the conventional projection display apparatus.
Figure 10:
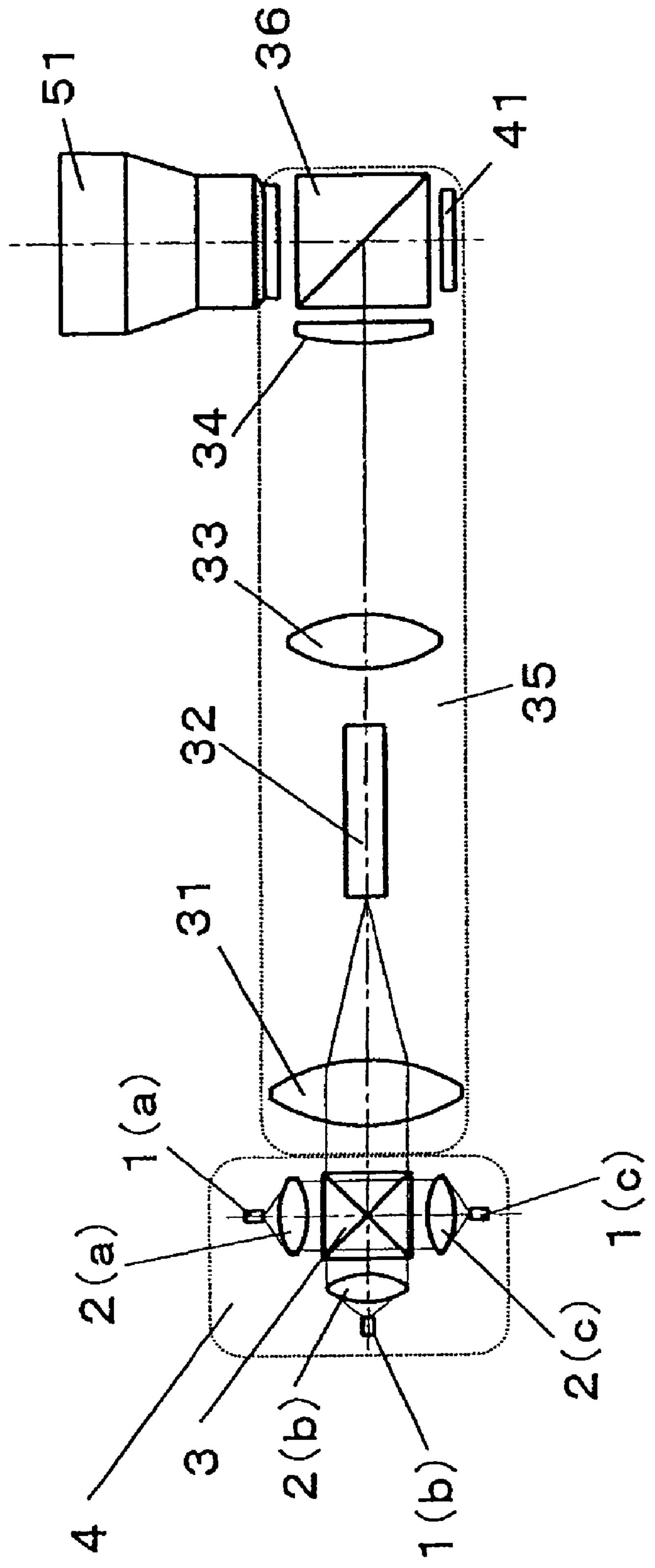
FIG. 10 is a view showing a second example of an outlined configuration of the conventional projection display apparatus.
Figure 11:
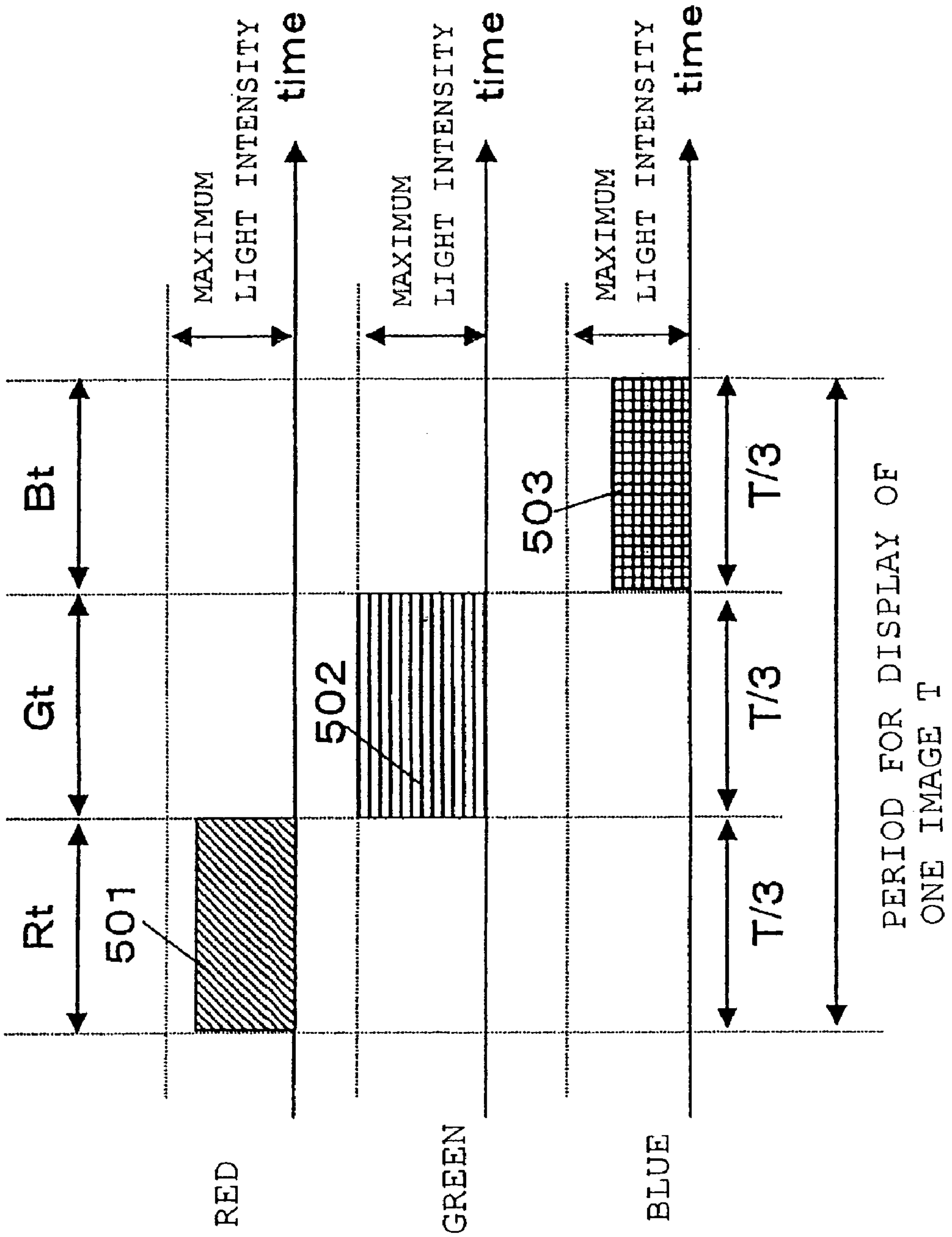
FIG. 11 is a view showing a first example of the intensity and time schedule of light of each color output from the conventional display apparatus.

Further, in FIG. 1, the rod integrator 32 is used as an optical instrument allowing uniform illumination by the illumination unit 35, but a first lens array 301 and a second lens array 302 having a plurality of lenses arranged tow-dimensionally may be used as shown in FIG. 7.

Further, in the projection display apparatus described above, the reflection display element 41 is used as an image display element, but the projection display apparatus may be a projection display apparatus having a transmission display element, a DMD (digital micro-mirror device) capable of changing the reflection direction by very small mirrors arranged in the form of an array, or a display element like as a liquid crystal as a light modulation element of the present invention.

Further, in the projection display apparatus described above, the number of light emitting diodes 1 as a solid light source is 1 for each single color, which is a minimum number, but the number of light emitting diodes is not specifically limited to 1 for each single color, and the light generating instrument may be formed using a plurality of light emitting diodes.

A program according to the present invention may be a program of performing all or part of the function of the control instrument 10 of the above light emitting apparatus of the present invention by a computer, the program operating in collaboration with the computer.

The present invention may be a medium recording a program of performing all or part of the function of the above control instrument 10 of the present invention by a computer, wherein the medium is readable by the computer, and the read program performs the function in collaboration with the computer.

A recording medium capable of being read by a computer in which a program of the present invention is recorded is also included in the present invention.

One usage form of the program of the present invention may be an aspect in which the program is recorded in the recording medium capable of being read by a computer, and operates in collaboration with a computer.

One usage form of the program of the present invention maybe an aspect in which the program is transmitted through a transmission medium and read by a computer, and operates in collaboration with the computer.

Recording media include a ROM and the like, and transmission media include transmission mechanisms such as Internet, light, electric waves, acoustic waves and the like.

The above computer of the present invention may include not only pure hardware such as a CPU but also firmware, OS and peripheral devices.

As described above, the configuration of the present invention may be realized software-wise or realized hardware-wise.

INDUSTRIAL APPLICABILITY

A light emitting apparatus and a projection display apparatus according to the present invention can be adapted to a display apparatus capable of projecting images, such as a projection display apparatus requiring an effect of obtaining a high light utilization efficiency using a light source emitting single-color light, which is represented by a solid light source such as a light emitting diode.

The invention claimed is:

1. A light emission method in which light as a light source for imaging is emitted using a first light source of emitting red light, a second light source of emitting green light and a third light source of emitting blue light, said method comprising:

a first light emitting step of making said first light source emit light in a first light emission period;

a second light emitting step of making said second light source emit light in a second light emission period;

a third light emitting step of making said third light source emit light in a third light emission period; and a fourth light emitting step of making said first light source, said second light source and said third light source emit light at the same time in a fourth light emission period, in a period for display of one image, wherein at least one duration compared to another duration of said first light emission period, said second light emission period and said third light emission period are respectively different, wherein at least one of said first light source, said second light source and said third light source emits light with a different light intensity compared to the remaining light sources in said fourth light emission period, wherein at least any one of the below applies:

the light intensity of said first light source in said first light emission period being different from that in said fourth light emission period;

the light intensity of said second light source in said second light emission period being different from that in said fourth light emission period; and the light intensity of said third light source in said third light emission period being different from that in said fourth light emission period, and wherein a ratio of the light amount of said first light source in said first light emission period, the light amount of said second light source in said second light emission period, and the light amount of said third light source in said third light emission period, and a ratio of the light amount of said first light source, the light amount of said second light source and the light amount of said third light source in said fourth light emission period are substantially the same.

2. A light emitting apparatus comprising:

a first light source for emitting red light in a first and a fourth light emission periods in a period for display of one image;

a second light source for emitting green light in a second and a fourth light emission periods in a period for display of one image; and a third light source for emitting blue light in a third and a fourth light emission pe riods in a period for display of one image, wherein at least one duration compared to another duration of said first light emission period, said second light emission period and said third light emission period are respectively different, wherein at least one of said first light source, said second light source and said third light source emits light with a different light intensity compared to the remaining light sources in said fourth light emission period, and wherein a ratio of the light amount of said first light source in said first light emission period, the light amount of said second light source in said second light emission period and the light amount of said third light source in said third light emission period, and a ratio of the light amount of said first light source, the light amount of said second light source and the light amount of said third light source in said fourth light emission period are substantially the same.

* * * * *